(12) United States Patent
Taaghol (10) Patent No.: US 8,914,066 B2
(45) Date of Patent: *Dec. 16, 2014

(54) FIELD PROGRAMMING OF A MOBILE STATION WITH SUBSCRIBER IDENTIFICATION AND RELATED INFORMATION

(71) Applicant: Intel Corporation, Santa Clara, CA (US)

(72) Inventor: Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 13/675,976

(22) Filed: Nov. 13, 2012

(65) Prior Publication Data

US 2013/0094651 A1   Apr. 18, 2013

Related U.S. Application Data

(63) Continuation of application No. 11/763,978, filed on Jun. 15, 2007, now Pat. No. 8,331,989.

(51) Int. Cl.

| H04M 1/00 | (2006.01) |
| H04W 12/04 | (2009.01) |
| H04L 9/08 | (2006.01) |
| H04W 12/06 | (2009.01) |
| H04W 8/26 | (2009.01) |

(52) U.S. Cl.
CPC .............. H04W 12/04 (2013.01); *H04W 12/06* (2013.01); *H04W 8/265* (2013.01); H04L 9/0841 (2013.01)
USPC ........ 455/558; 455/418; 455/419; 455/414.1; 380/270

(58) Field of Classification Search
CPC ..... H04W 12/06; H04W 12/04; H04W 12/00; H04W 12/08; H04L 63/062; H04L 63/0853
USPC .......................................................... 455/558
See application file for complete search history.

(56) References Cited

U.S. PATENT DOCUMENTS

| 5,557,679 A | 9/1996 | Julin et al. |
| 6,799,155 B1 | 9/2004 | Lindemann et al. |

(Continued)

FOREIGN PATENT DOCUMENTS

| CN | 1444414 A | 9/2003 |
| CN | 1507720 A | 6/2004 |
| WO | 98/16035 | 4/1998 |

OTHER PUBLICATIONS

Notice of Grant issued Apr. 3, 2013 from Chinese Patent Application No. 200880020010.4.

(Continued)

*Primary Examiner* — Nathan Mitchell
(74) *Attorney, Agent, or Firm* — Schwabe, Williamson & Wyatt, P.C.

(57) ABSTRACT

Apparatuses and methods for field programming a private security key into a mobile station are described herein. The methods may include a server initially accepting in a wireless network a connection from a mobile station that is without a factory programmed subscriber identification module (SIM). The server may then collaborate with the mobile station to field program the mobile station with an international mobile subscriber identification (IMSI) and a private security key ($K_i$).

23 Claims, 3 Drawing Sheets

(56) References Cited

U.S. PATENT DOCUMENTS

| | | | |
|---|---|---|---|
| 7,353,017 B2* | 4/2008 | Chen et al. | 455/414.2 |
| 7,418,596 B1 | 8/2008 | Carroll et al. | |
| 8,112,118 B2* | 2/2012 | Shieh et al. | 455/558 |
| 8,442,507 B2* | 5/2013 | Duggal et al. | 455/418 |
| 2002/0118674 A1 | 8/2002 | Faccin et al. | |
| 2003/0031151 A1 | 2/2003 | Sharma et al. | |
| 2003/0172278 A1 | 9/2003 | Farnham et al. | |
| 2003/0210789 A1 | 11/2003 | Farnham et al. | |
| 2004/0117623 A1 | 6/2004 | Kalogridis et al. | |
| 2004/0240671 A1 | 12/2004 | Hu et al. | |
| 2005/0181793 A1* | 8/2005 | Netanel | 455/435.2 |
| 2006/0206710 A1 | 9/2006 | Gehrmann | |
| 2007/0066292 A1* | 3/2007 | Benco et al. | 455/418 |
| 2007/0082655 A1* | 4/2007 | Link et al. | 455/410 |
| 2007/0083766 A1 | 4/2007 | Farnham et al. | |
| 2008/0108321 A1* | 5/2008 | Taaghol et al. | 455/410 |
| 2008/0127320 A1 | 5/2008 | De Lutiis et al. | |
| 2008/0171532 A1* | 7/2008 | Shieh et al. | 455/410 |
| 2009/0025070 A1* | 1/2009 | Netanel et al. | 726/5 |
| 2010/0009659 A1* | 1/2010 | Netanel et al. | 455/411 |
| 2010/0173609 A1* | 7/2010 | Netanel et al. | 455/411 |

OTHER PUBLICATIONS

Whitfield Diffe et al., "New Directions in Cryptography," IEEE Transactions on Information Theory, vol. IT.22, No. 6, Nov. 1976, pp. 644-654.

First Office Action issued Jan. 11, 2012 from Chinese Application No. 200880020010.4.

Written Opinion mailed Dec. 29, 2008 from International Application No. PCT/US2008/066395.

International Preliminary Report on Patentability mailed Dec. 30, 2009 from International Application No. PCT/US2008/066395.

* cited by examiner

FIELD PROGRAMMING OF A MOBILE STATION WITH SUBSCRIBER IDENTIFICATION AND RELATED INFORMATION

CROSS REFERENCE TO RELATED APPLICATIONS

The present application is a continuation of U.S. patent application Ser. No. 11/763,978 filed Jun. 15, 2007, entitled, "Field Programming Of A Mobile Station With Subscriber Identification And Related Information," the entire specification of which is hereby incorporated by reference in its entirety for all purposes, except for those sections, if any, that are inconsistent with this specification.

TECHNICAL FIELD

Embodiments of the present invention relate to the field of wireless communication, more specifically, to methods and apparatuses for field provisioning of mobile stations with subscriber identification and related information.

BACKGROUND

In certain types of wireless networks, such as Global System for Mobile Communications (GSM) networks, service providers of such networks use subscriber identity module (SIM) in the form of removable smart card also known as Universal integrated Circuit Card (UICC) in mobile devices to identify and authenticate a subscriber/user. As is well-known, a SIM will typically include various types of information including subscriber identification/credentials, billing relationship, roaming support, and so forth.

Typically, the SIMs are provided directly to the end users by the service providers, and the information endowed in the SIMs are factory programmed. A SIM that is provided to an end user or subscriber will include a subscriber identity known as IMSI (International Mobile Subscriber Module) and a unique 128-bit private security key (known as $K_i$), programmed into the SIM when the SIM is manufactured. IMSI is used to identify the subscriber to the service provider during initial call establishment. A copy of the pre-programmed $K_i$ is also typically stored at a Home Location Register (HLR) in the service provider network. The $K_i$ is used to calculate the response to the challenges made in the authentication phase, and is also used to create the 64-bit encryption key (Kc) for encryption of user traffic during a call/session.

As briefly described above, a unique $K_i$ is programmed into a SIM card before the SIM card is distributed to a user/subscriber. Since a matching $K_i$ also needs to be programmed in the operator's HLR, the SIM card distributed to the subscriber is operator specific. This creates a challenge in retail distribution model of mobile devices since the purchasers of such devices needs to also have an operator specific SIM in the device before being able to connect to the corresponding network. Ideally, the retail distribution model should allow a device be sold to the end user without any embedded service provider specific image (i.e., service provider programs or data). Further, once a user decides to subscribe to a particular service provider, the device should be able to be provisioned over-the-air with the operator specific image and user credentials.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF ILLUSTRATIVE EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the instant description, the phrase "A/B" means A or B. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

According to various embodiment of the present invention, apparatuses and methods are provided that enable a mobile station (MS) of a wireless network, in cooperation or collaboration with a provisioning server (or simply "server"), to field program the MS with at least an IMSI and an associated private key ($K_i$). For the embodiments, once the IMSI is field programmed into the MS, the IMSI may be used by the MS to identify a subscriber to a wireless service provider whenever the MS attempts to connect to the wireless service provider for wireless service. The $K_i$ that is field programmed into the MS, in contrast, may be for use by the MS to authenticate the subscriber to the wireless service provider when the MS is attempting to establish a connection with the wireless service provider as well as for use by the MS to generate an encryption key ($K_c$) needed to encrypt communication to be sent from the MS to the wireless service provider after a connection has been established with the wireless network. A mobile station may be any one of a number of mobile devices capable of communicating wirelessly such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and so forth.

In accordance with various embodiments of the present invention, the MS and the server may use particular equations in order to symmetrically calculate matching security keys ($K_i$) at the MS and at the provisioning server. The words "symmetrical" or "symmetrically" as used herein is in reference to the ability to identically generate or reproduce the same value at different network devices or locations. By employing such methods, man-in-the middle attacks (in which a third party may intercept a $K_i$ being programmed over the air) may be advantageously avoided, and the MS may be safely and securely field programmed with a K. For example, in some embodiments of the present invention, the MS may calculate a $K_i$ using the equation $K_i=(G^B \bmod P)^A \bmod P$, while the server may symmetrically calculate a copy of the $K_i$ that matches the $K_i$ calculated by the MS using the equation $K_i=(G^B \bmod P)^A \bmod P$. The variables A, B, G, and P will be described in greater detail below.

Figure 1:
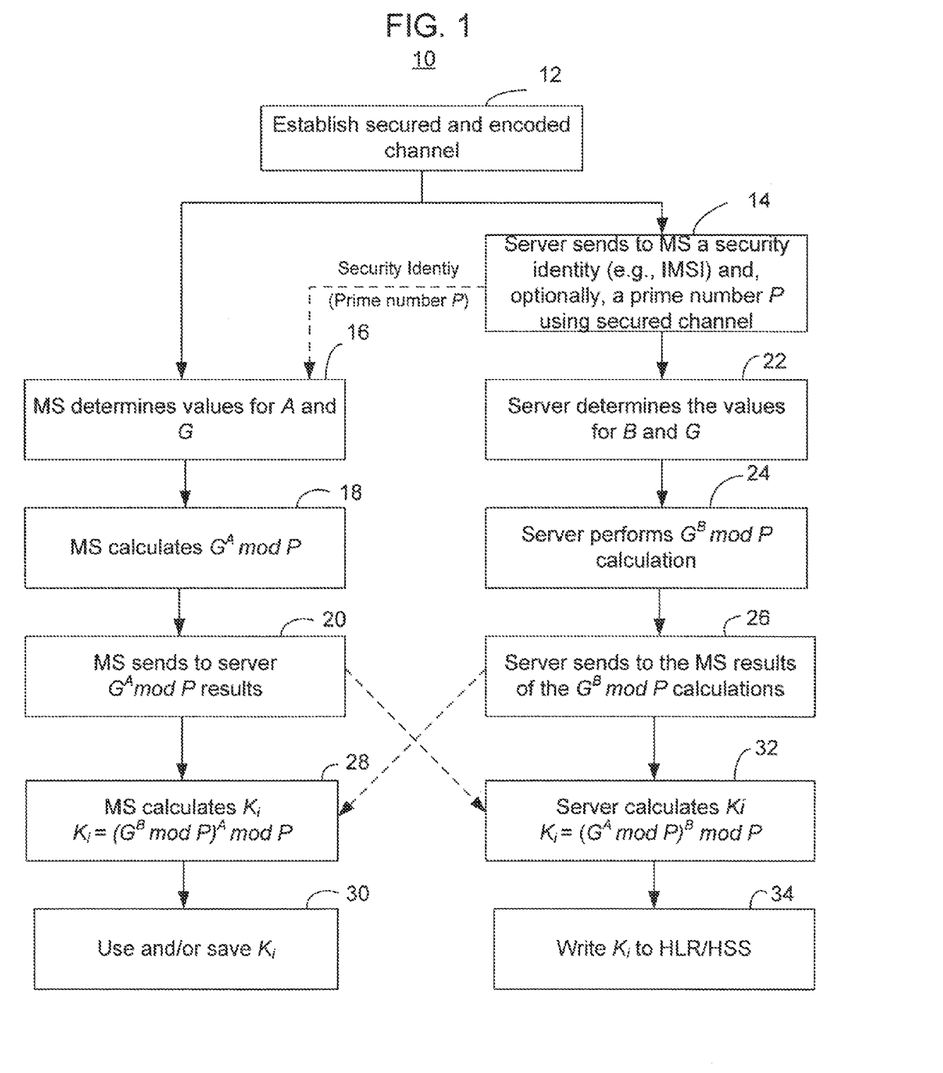
FIG. 1 illustrates a process for a mobile station and a server to collaboratively field program the mobile station with a private security key ($K_i$), in accordance with various embodiments of the present invention.

FIG. 1 illustrates a process in which a mobile station (MS) of a wireless network, in cooperation with a provisioning server, may be securely field programmed with a $K_i$ in accordance with various embodiments of the present invention. The wireless network may be any one or more of a variety of wireless networks including, for example, a Worldwide Interoperability for Microwave Access (WiMAX) network, a GSM network, a 2G/3G network, and so forth. As will be described, the left side of the process 10 may be performed by the MS, while the right side of the process 10 may be performed by the provisioning server or simply "server." The process 10, however, may begin when the MS and the server collaboratively establishes a secured and encoded channel between the MS and the server at 12. Note that prior to the establishment of the secured and encoded channel, the MS may be an MS without a factory programmed SIM. Thus, in order to establish the secured and encoded channel, the server may need to accept a connection from the mobile station without a factory programmed SIM. The secured and encoded channel may be established using, for example, Secure Socket Layer/Transport Security (SSL/TLS) security and digital certificate (X.509 key) exchanges and RSA (Ronald L. Rivest, Adi Shamir, and Len M. Adleman) authentication.

The server may then send or allocate to the MS, using the secured channel, a security identity and a very large prime number P using the secured channel at 14. The security identity, in some instances, may be an IMSI provided from an IMSI pool comprising of unused and available IMSIs, which the server may maintain or have access to. Alternatively, instead of the server providing the large prime number P, the prime number P may be preprovisioned in the MS, e.g., factory installed in the MS. In either case, the value for the large prime number P may be "known" by both the MS and the server.

The MS may then determine the numerical values for A and G at 16. The value for G may be preprovisioned in the MS or may be derived using the IMSI. Note that since the IMSI may be sent by the server and is, therefore, also available to the server, the server may also be able to identically generate the same value for G. For example, suppose both the MS and the server knows to use the same equation (e.g., $G=(IMSI)^3+5$) to derive the value for G, then so long as both have IMSI, G may be symmetrically determinable at both ends. If the value for G is pre-provisioned in the MS (e.g., factory programmed), then the server may already know the value of G or at least have access to it. Thus, in either case, whether G is determined by the MS using the IMSI or in the case where G is preprovisioned into the MS, the value for G may be symmetrically determinable by both the MS and the server.

With respect to A, the MS may select a large numerical value for A that is greater than the numerical value of G. The MS may randomly select or generate using the digital certificate (X.509 key) a value for A. The MS may then calculate $G^A \bmod P$ based on the previously determined values for G, A, and P at 18. The MS may then send the results of the $G^A \bmod P$ calculation to the server using the secured channel to facilitate the server to symmetrically calculate a matching $K_i$ at 20. Since the $K_i$ symmetrically calculated at the server may be identical to the $K_i$ calculated at the MS, the $K_i$ calculated at the server may be referred to herein as a matching $K_i$ or a copy of the K.

Referring now to the right side of the process 10, after the secured and encoded channel has been established at 12, the server may then determine the values for B and G at 22. The value for G may already be known to the server as previously indicated, when for example, the value of G is pre-provisioned in the MS. Alternatively, the value for G may be derived from the IMSI assigned to the MS, which the server may have provided to the MS. With respect to the value for B, the server may select a very large numerical value for B. The server may select a value for B that may be randomly selected or use the digital certificate (X.509) to derive a value for B.

After determining the values for G and B, the server may then calculate $G^B \bmod P$ (recall that the prime number P is known by the server) at 24. The server may then send to the MS the results of the $G^B \bmod P$ calculation. The results of the $G^B \bmod P$ calculation provided by the server (as indicated by the dashing arrow line originating from ref. 26) may then be used by the MS to calculate a value for a $K_i$ using the equation $K_i=(G^B \bmod P)^A \bmod P$ at 28. Correspondingly and symmetrically, the server may calculate, based on the results of the $G^A \bmod P$ calculations received from the MS (as indicated by the dashing arrow line originating from ref. 20) and using the equation $K_i=(G^A \bmod P)^B \bmod P$, a value for a local copy of the $K_i$ that matches the value of the $K_i$ generated by the MS at 32. The value or the $K_i$ calculated by the MS may then be used and/or saved to a memory device at 30. Similarly, the copy of the $K_i$ generated by the server may be written to HLR/HSS (Home Location Register/Home Subscription Server) at 34.

Figure 2:
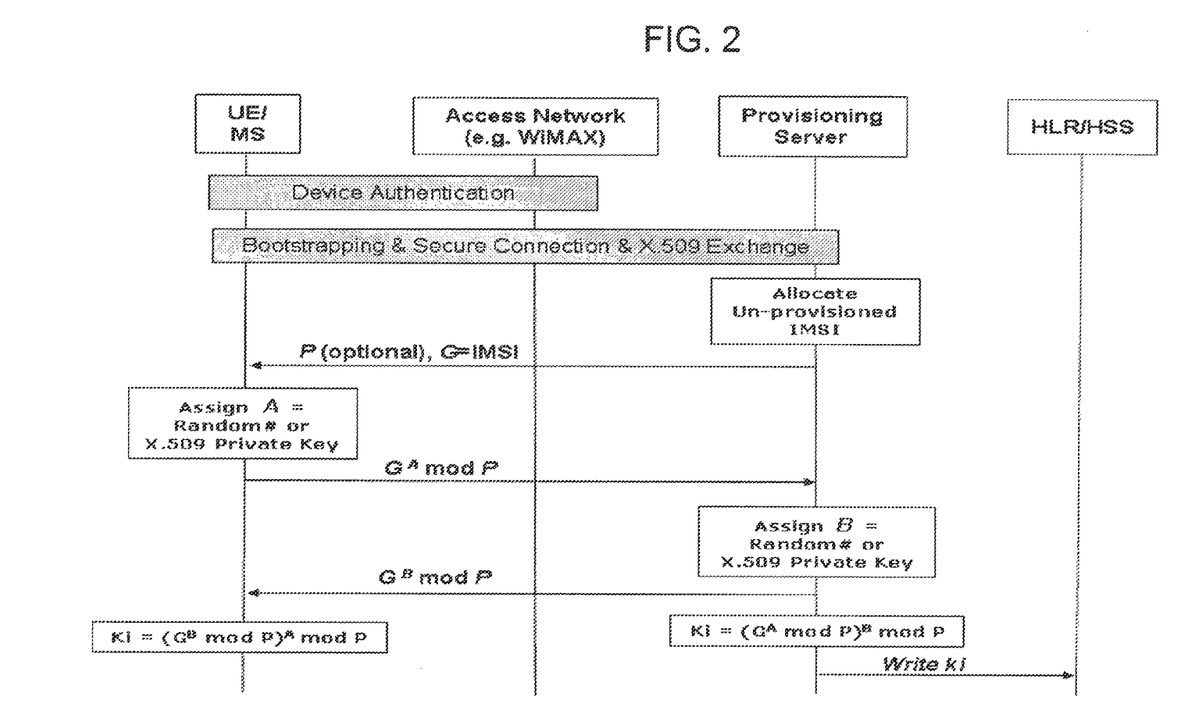
FIG. 2 illustrates a wireless network process that generally corresponds to process of FIG. 1, in accordance with various embodiments of the present invention.

Referring to FIG. 2 illustrating a wireless network process that generally corresponds to the above described process 10, in accordance with various embodiments of the present invention. The wireless network may be, although not limited to, a WiMAX network. As can be seen, corresponding and matching $K_i$ values may be symmetrically calculated at the MS and at the server by calculating for $(G^B \bmod P)^A \bmod P$ at the MS, and calculating for $(G^A \bmod P)^B \bmod P$ at the server.

To summarize the above, a value for $K_i$ may be symmetrically determined at both the MS and the server by the following equation:

$$K_i = (G^B \bmod P)^A \bmod P = G^A \bmod P)^B \bmod P,$$

where
- P=large prime number—may be preprovisioned at the MS or sent to the MS by the server. If preprovisioned at the MS, then server also has access to it.
- A=large number—MS may randomly select it or use its security key (X.509 key) to generate it.
- B=large number—server may randomly select it or use the security key (X.509) key to generate it.
- G=smaller value than A—may be preprovisioned in the MS or derived from the IMSI identically by the MS and the server.

Thus, the numerical values for the variables A and B may be provided by the MS and server, respectively, while the numerical values for G and P may be symmetrically obtainable by both the MS and the server.

Figure 3:
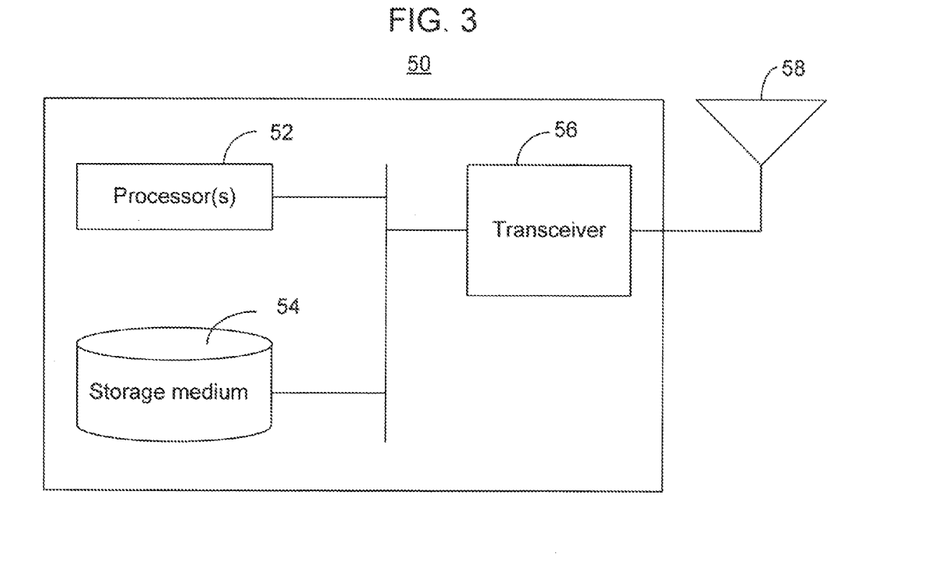
FIG. 3 illustrates an exemplary device designed to communicate in a wireless network, in accordance with various embodiments of the present invention.

FIG. 3 illustrates an exemplary device designed to communicate in a wireless network in accordance with various embodiments of the present invention. For the embodiments, the device 50 may be a mobile station and may include, among other things, one or more processors 52, a storage medium 54, a transceiver 56, and one or more omnidirectional or directional antennas 58, coupled together as shown. Additional components not depicted may also be included in the device 50 such as a user interface, input/output (I/O) device, an additional memory device for storing, for example, $K_i$, and so forth.

The various components of the device 50 may be employed to execute the MS operations previously described in order to enable the device 50 to be field programmed with an IMSI and a K. For example, the transceiver 56 using the one or more omnidirectional or directional antennas 58 may be designed to transmit signals over, and receive signals from the wireless network. The storage medium 54, which may be a memory device such as a computer readable storage medium, may store programming instructions to be operated by the one or more processors 52 to enable the device 50 to cooperate with a server of the wireless network and allow the server to field program the device 50 with an IMSI and an associated private key ($K_i$) as described before. The programming instructions may be further adapted to be operated by the one or more processors 52 to perform the other previously described MS operations (as depicted, e.g., on the left side of FIG. 1) including, for example, sending the results of the $G^A \bmod P$ calculations to the server and calculating $(G^B \bmod P)^A \bmod P$ to obtain the value for $K_i$.

Figure 4:
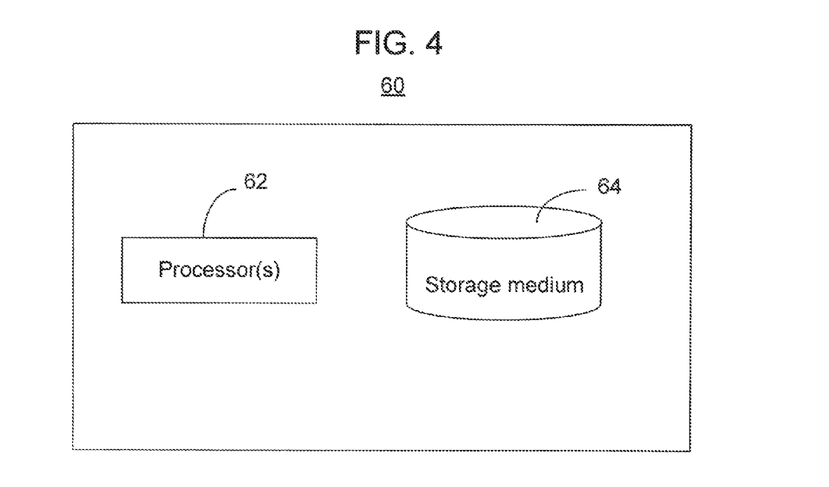
FIG. 4 illustrates an exemplary provisioning server, in accordance with various embodiments of the present invention.

FIG. 4 illustrates an exemplary provisioning server in accordance with various embodiments of the present invention. For the embodiments, the server 60 may include, among other things, one or more processors 62 and a storage medium 64. The storage medium 64 may be an article of manufacture such as a computer readable storage medium having stored therein a plurality of programming instructions configured to program the server 60 to enable the server 60 to perform the various server operations described earlier. For instance, the programming instructions may program the server 60 to enable the server 60 to collaborate with a mobile station to field program the mobile station with an IMSI and $K_i$ and to generate a local copy of the $K_i$ that matches the $K_i$ of the mobile station.

The programming instructions may be further adapted to enable the server 60 to perform the other previously described server operations including, for example, accepting a connection from an MS without a factory programmed SIM, sending the results of $G^B \bmod P$ calculation to the MS, and calculating $(G^A \bmod P)^B \bmod P$ to symmetrically calculate a local copy of the $K_i$ that matches the $K_i$ field programmed into the MS as previously described.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A mobile device, comprising:
   a transceiver to transmit signals over, and receive signals from a wireless network;
   one or more processors coupled to the transceiver;
   one or more storage media coupled to the processors, the one or more storage media having stored thereon instructions which, when executed by the one or more processors, enable the mobile device to cooperate with a server of the wireless network to field program the mobile device with an international mobile subscriber identification (IMSI) and an associated private key (Ki);
   wherein the mobile device is configured to use the IMSI to identify a subscriber to a wireless service provider whenever the mobile device attempts to connect to the wireless service provider for wireless service;
   wherein the mobile device is further configured to use the Ki to authenticate the subscriber to the wireless service provider when attempting to establish a connection with the wireless service provider; and
   wherein the mobile device is further configured to use the Ki to generate an encryption key (Kc) to encrypt communication to be sent from the mobile device to the wireless service provider after a connection has been established.

2. The mobile device of claim 1, wherein the instructions, when executed by the one or more processors, further enable the mobile device to receive the IMSI from the server.

3. The mobile device of claim 2, wherein the instructions, when executed by the one or more processors, further enable the mobile device to:
   receive from the server a prime number (P) and results of a GB mod P calculation; and
   symmetrically calculate a Ki that matches another Ki associated with the server based at least in part on (GB mod P)A mod P;
   wherein A and B are numerical values to be provided by the mobile device and server, respectively, and G is a numerical value symmetrically determinable by both the mobile device and the server.

4. The mobile device of claim 3, wherein the instructions, when executed by the one or more processors, further enable the mobile device to establish a secured wireless communication channel with the server; and
   receive through the secured wireless communication channel a numerical value that embodies P.

5. The mobile device of claim 3, wherein the instructions, when executed by the one or more processors, further enable the mobile device to derive a value for G using the IMSI.

6. The mobile device of claim 5, wherein the instructions, when executed by the one or more processors, further enable the mobile device to establish a secured wireless communication channel with the server based at least in part on a digital certificate and selecting a value for A by randomly selecting a value for A that is greater than G or using the digital certificate to select a value for A that is greater than G.

7. The mobile device of claim 6, wherein the instructions, when executed by the one or more processors, further enable the mobile device to send to the server, through the secured wireless communication channel, results of a GA mod P calculation to facilitate symmetrical calculation of the other Ki associated with the server.

8. The mobile device of claim 1, wherein the instructions, when executed by the one or more processors, further enable the mobile device to save the Ki into a memory device of the mobile device.

9. A method, comprising:
accepting, by a server of a wireless network, a connection from a mobile device without a factory programmed subscriber identification module;
collaborating by the server with the mobile device to field program the mobile device with an international mobile subscriber identification (IMSI) and a private key (Ki), the IMSI used to identify a subscriber to a wireless service provider whenever the mobile device attempts to connect to the wireless service provider for wireless service, and the Ki used to authenticate the subscriber to the wireless service provider when attempting to establish a connection with the wireless service provider as well as used to generate an encryption key (Kc) to encrypt communication to be sent from the mobile device to the wireless service provider after a connection has been established.

10. The method of claim 9, wherein said collaborating comprises sending, by the server, the IMSI to the mobile device.

11. The method of claim 9, further comprising sending, by the server, a prime number (P) to the mobile device to facilitate the mobile device in calculating the Ki.

12. The method of claim 11, further comprising:
selecting by the server a value for B and calculating GB mod P, wherein G is a numerical value symmetrically determinable by both the server and the mobile device; and
sending by the server the results of the GB mod P calculation to the mobile device to facilitate the mobile device in the calculation of the Ki.

13. The method of claim 12, further comprising:
facilitating by the server establishment of a secured wireless communication channel with the mobile device at least in part by transmitting a digital certificate to the mobile device;
wherein the selecting by the server a value for B comprises randomly selecting a value for B or generating a value for B by using the digital certificate.

14. The method of claim 9, further comprising receiving by the server from the mobile device a quantity GA mod P calculated by the mobile device; and
symmetrically calculating a local copy of Ki that matches the Ki calculated by the mobile device, the local copy of Ki being calculated by calculating for (GA mod P)B mod P;
wherein A and B are numerical values to be provided by the mobile device and server, respectively, and G is a numerical value symmetrically determinable by both the mobile device and the server.

15. The method of claim 14, further comprising deriving, by the server, a value for G based at least in part on the IMSI.

16. The method of claim 14, further comprising facilitating, by the server, establishment of a secured wireless communication channel with the mobile device at least in part by transmitting to the mobile device a digital certificate, wherein a value for B is selected by the server based at least in part on randomly selecting a value for B or using the digital certificate to select a value for B.

17. The method of claim 9, further comprising writing by the server to a Home Location Register (HLR) the Ki.

18. A server, comprising:
one or more storage media; and
a plurality of programming instructions which, when executed by one or more processors of the server, enable the server to:
accept, in a wireless network, a connection from a mobile device without a factory programmed subscriber identification module; and
collaborate with the mobile to field program the mobile device with an international mobile subscriber identification (IMSI) and a private key (Ki);
wherein the IMSI enables identification of a subscriber to a wireless service provider upon an attempt to connect to the wireless service provider for wireless service
wherein the Ki enables authentication of the subscriber to the wireless service provider when attempting to establish a connection with the wireless service provider; and
wherein the Ki enables generation of an encryption key (Kc) to encrypt communication from the mobile device to the wireless service provider after a connection has been established.

19. The server of claim 18, wherein the instructions, when executed by the one or more processors, further enable the server to send a prime number (P) to the mobile device to facilitate the mobile device in calculating the Ki.

20. The server of claim 19, wherein the instructions, when executed by the one or more processors, further enable the server to:
select a value for B and to calculate GB mod P, wherein G is a numerical value symmetrically determinable by both the server and the mobile device; and
send the results of the GB mod P calculation to the mobile device to facilitate the mobile device in the calculation of the Ki.

21. The server of claim 18, wherein the instructions, when executed by the one or more processors, further enable the server to receive from the mobile device a quantity GA mod P calculated by the mobile device; and
symmetrically calculate, based at least in part on (GA mod P)B mod P, a local copy of Ki that matches the Ki calculated by the mobile device;
wherein A and B are numerical values to be provided by the mobile device and the server, respectively, and G is a numerical value symmetrically determinable by both the mobile device and the server.

22. A mobile device, comprising:
an omnidirectional antenna;
a transceiver coupled to the omnidirectional antenna to transmit signals over, and receive signals from a wireless network;
one or more processors coupled to the transceiver;
one or more storage media coupled to the processors, the one or more storage media having stored therein instructions which, when executed by the one or more processors, enable the mobile device to:

cooperate with a server of the wireless network to allow the server to field program the mobile device with an international mobile subscriber identification (IMSI) and an associated private key (Ki);

identify, based at least in part on the IMSI, a subscriber to a wireless service provider whenever the mobile device attempts to connect to the wireless service provider for wireless service;

authenticate, based at least in part on the Ki, the subscriber to the wireless service provider when attempting to establish a connection with the wireless service provider; and generate, based at least in part on the Ki, an encryption key (Kc) to encrypt communication to be sent from the mobile device to the wireless service provider after a connection has been established.

23. The mobile device of claim 22, wherein the instructions, when executed by the one or more processors, further enable the mobile device to:

receive from the server a prime number (P) and results of a $G^B$ mod P calculation; and symmetrically calculate, based at least in part on $(G^B \bmod P)^A \bmod P$, a Ki that matches another Ki associated with the server by;

wherein A and B are numerical values to be provided by the mobile device and the server, respectively, and G is a numerical value symmetrically determinable by both the mobile device and the server.

* * * * *

UNITED STATES PATENT AND TRADEMARK OFFICE
CERTIFICATE OF CORRECTION

PATENT NO. : 8,914,066 B2  Page 1 of 1
APPLICATION NO. : 13/675976
DATED : December 16, 2014
INVENTOR(S) : Pouya Taaghol It is certified that error appears in the above-identified patent and that said Letters Patent is hereby corrected as shown below:

In the Claims

Column 8
Line 21, "...the mobile to field program" should read -- ...the mobile device to field program...

Column 9
Line 23, "...the server by;" should read -- ...the server;

Signed and Sealed this
Fifteenth Day of December, 2015

Michelle K. Lee
*Director of the United States Patent and Trademark Office*